United States Patent
Tamaki et al.

(10) Patent No.: US 7,656,960 B2
(45) Date of Patent: Feb. 2, 2010

(54) ADAPTIVE MODULATION METHOD AND CODING RATE CONTROL METHOD

(75) Inventors: Satoshi Tamaki, Kokubunji (JP); Takashi Yano, Tokorozawa (JP); Seishi Hanaoka, Tokyo (JP); Toshiyuki Saito, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 11/066,185

(22) Filed: Feb. 25, 2005

(65) Prior Publication Data
US 2006/0165190 A1  Jul. 27, 2006

(30) Foreign Application Priority Data
Jan. 21, 2005  (JP)  ............... 2005-013468

(51) Int. Cl.
H04L 5/12 (2006.01)
(52) U.S. Cl. ............ 375/262; 375/219; 375/221; 375/259; 375/261; 375/298; 375/341; 455/23; 455/42; 455/102; 455/108; 455/205; 455/222; 455/296; 332/103; 332/104; 332/105; 704/242; 714/795
(58) Field of Classification Search ............... 375/219, 375/221, 259, 261, 298, 341; 455/23, 42, 455/102, 108, 205, 222, 296; 332/103, 104, 332/105; 704/242; 714/795
See application file for complete search history.

(56) References Cited
U.S. PATENT DOCUMENTS

| 6,101,168 A * | 8/2000 | Chen et al. ............... 370/228 |
|---|---|---|
| 6,243,423 B1 * | 6/2001 | Sakoda et al. ............ 375/262 |
| 6,611,564 B1 * | 8/2003 | Linz et al. ............... 375/295 |
| 6,940,915 B2 * | 9/2005 | Tang ....................... 375/261 |
| 7,158,473 B2 * | 1/2007 | Kurobe et al. ............ 370/204 |
| 2003/0090993 A1 * | 5/2003 | Sato ......................... 370/203 |
| 2005/0135493 A1 * | 6/2005 | Maltsev et al. ........... 375/260 |

OTHER PUBLICATIONS

U.S. Appl. No. 11/028,938, filed Jan. 5, 2005, Tamaki et al.
U.S. Appl. No. 10/926,143, filed Aug. 26, 2004, Tamaki et al.
U.S. Appl. No. 10/894,062, filed Jul. 20, 2004, Hanaoka et al.
U.S. Appl. No. 10/760,299, filed Jan. 21, 2004, Tamaki et al.

(Continued)

Primary Examiner—Shuwang Liu
Assistant Examiner—Helene Tayong
(74) Attorney, Agent, or Firm—Stites & Harbison PLLC; Juan Carlos A. Marquez, Esq.

(57) ABSTRACT

In a radio communication system, transmitter and receiver stations share information on a maximum number of bits communicated per symbol. The transmitter station encodes a signal with sufficient error correcting capabilities to create a codeword. The transmitter station allocates the bits from the codeword to each symbol, modulates the symbols using a modulation type which processes symbols each having a number of bits equal to or smaller than the maximum number of bits per symbol, and transmits the modulated symbols. The receiver station demodulates the symbols using a modulation type which processes a larger number of bits per symbol as the transmission path quality is higher from among modulation types which process symbols having a number of bits equal to or smaller than the maximum number of bits per symbol.

9 Claims, 9 Drawing Sheets

OTHER PUBLICATIONS

Shinya Otsuki et al., "Performance of Modulation Level Controlled Adaptive Modulation Systems". The Transactions of the Institute of Electronics, Information and Communication Engineers, vol. J78-B-11, No. 6, (Jun. 1995), pp. 435-444 with 38 pages of English translation.

"CDMA2000 High Rate Packet Data Air Interface Specification", $3^{rd}$ Generation Partnership Project 2:3GPP@, Version 1.0 (Mar. 2004), pp. 14-20 to 14-24 and 14-47-14-53.

* cited by examiner

ADAPTIVE MODULATION METHOD AND CODING RATE CONTROL METHOD

INCORPORATION BY REFERENCE

The present application claims priority from Japanese application JP2005-013468 filed on Jan. 21, 2005, the content of which is hereby incorporated by reference into this application.

BACKGROUND OF THE INVENTION

The present invention relates to a radio communication system in which the quality of propagation paths varies over time, and more particularly, to a modulation method adapted to the varying quality of propagation paths and a method of controlling the coding rate of a channel code.

For increasing the amount of information transmitted per unit time in a radio communication system, multi-level modulation techniques are known for transmitting a plurality of bits of information per symbol.

In the multi-level modulation techniques, a larger number of bits per symbol results in a higher maximum throughput on propagation paths of higher quality, whereas errors are more likely to occur when the propagation path quality degrades, giving rise to a problem of a largely deteriorated throughput. For this reason, adaptive modulation techniques have been proposed in order to make stable communications in accordance with the propagation path quality. Specifically, the adaptive modulation techniques involve switching one modulation type to another such that a larger number of bits are modulated per symbol when a transmission path presents a high quality, while a smaller number of bits are modulated per symbol when a transmission path presents a low quality. Such techniques are described in an article entitled "Performance of Modulation Level Controlled Adaptive Modulation Systems" (The Institute of Electronics, Information and Communication Engineers Transaction B-II, Vol. J78-B-II, No. 6, pp. 435-555, June 1995).

Also, techniques have also been proposed for making communications at a throughput suitable for a particular quality of a propagation path by switching an coding rate of channel codes in addition to a quality-based modulation, and has been used, for example, in a system conforming to the standard "cdma2000 High Rate Packet Data Air Interface Specification" (3GPP2 C.S0024-A Version 1.0, March, 2004). Further, in the system described in "cdma2000 High Rate Packet Data Air Interface Specification," a transmitter station previously encodes a signal at a low coding rate, and transmits part of the encoded signal which is then decoded at a receiver station. When the signal is successfully decoded, the transmission is terminated. On the other hand, when the receiver station fails to demodulate the signal, the transmitter station transmits another part of the encoded signal again, and the receiver station decodes the other part of the signal in combination with the previously received signal, thereby adjusting the coding rate in accordance with an actual propagation path quality to make communications at a throughput suitable for the propagation path. This strategy is called HARQ (Hybrid Automatic Repeat reQuest).

Since a large amount of processing is generally required for decoding channel codes, a receiver station in the aforementioned HARQ scheme needs to decode an encoded signal each time the receiver station receives part of the encoded signal. It is therefore desirable to enhance the processing capability required for the receiver station. Also, in the HARQ scheme, the transmitter station must determine whether a retransmission should be done after the receiver station has completed the decoding, thereby causing a longer interval of transmission at the transmitter station, and a resulting increase in signal delay. It is therefore desirable to increase the capacity of a storage device required for holding largely delayed signals.

SUMMARY OF THE INVENTION

It is an object of the present invention to provide an adaptive modulation method and an coding rate control method for a radio communication system, wherein the former method controls an effective modulation level in accordance with the propagation path quality, while the latter method controls the coding rate without requiring repeated attempts at decoding in the receiver station, thereby eliminating the need for large processing capabilities in the receiver station.

In the adaptive modulation method according to the present invention, a transmitter station and a receiver station share information on a maximum number of bits communicated per symbol. The transmitter encodes a signal to be communicated with a code having sufficient error correcting capabilities to create a codeword. The transmitter allocates a maximum number of bits per symbol from the codeword to each symbol, modulates the symbols using a modulation type which processes a number of bits per symbols equal to or smaller than the maximum number of bits per symbol, and transmits the modulated symbols.

The receiver station demodulates received symbols corresponding to a modulation type which processes a larger number of bits per symbol as the propagation path quality is higher from among modulation types which process a number of bits per symbol equal to or smaller than the maximum number of bits per symbol. At the time the sum total of the number of bits per symbol of the modulation type used in the demodulation amounts to a predetermined value or more, the receiver station collects and decodes the demodulated symbols, and notifies the transmitter station of the completion of the transmission of the codeword.

In this way, the modulation type and coding rate can be controlled in accordance with the propagation path quality without the need for repeatedly attempting the decoding in the receiver station.

As appreciated from the foregoing, the present invention provides an adaptive modulation and a coding rate control method which can control a modulation type and an coding rate in accordance with the propagation path quality without the need for repeatedly attempting the decoding in the receiver station.

DETAILED DESCRIPTION OF THE EMBODIMENTS

Figure 1:
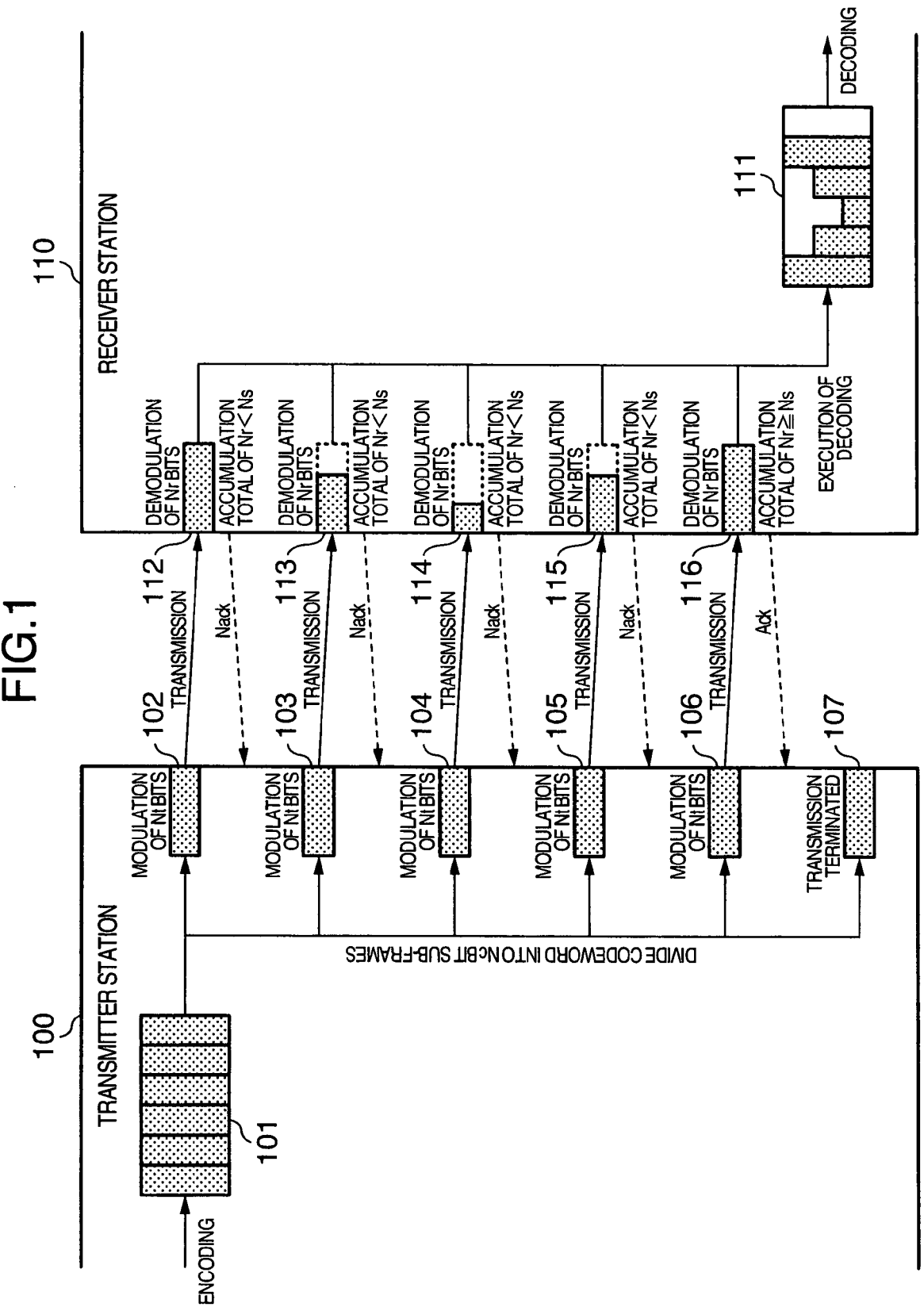
FIG. 1 is a diagram illustrating an adaptive modulation and coding rate control method according to a first embodiment of the present invention.

In the following, some embodiments of the present invention will be described with reference to the accompanying drawings. The following description is made on an adaptive modulation type which can maximally transmit six bits per symbol and employs 64 QAM (Quadrature Amplitude Modulation), 16 QAM or QPSK (Quadrature Phase Shift Keying) modulation, but the application of the present invention is not limited to such a number of bits which can be maximally transmitted per symbol or such modulation types, but the present invention can be applied as well to a modulation type which can maximally transmit, more generally, 2 m bits per symbol and employs $2^{2k}$ QAM ($\underline{k}$ is a natural number equal to or less than $\underline{m}$) modulation for demodulation. Also, assume in the foregoing that 4 QAM, which corresponds to $2^{2k}$ QAM when k=1, represents the same modulation type as QPSK. Further, a modulation type to which the present invention can be applied, may be more generally a modulation type which is capable of communicating two bits or more per modulated symbol, and is capable of establishing at least one bit in the event of demodulation in a situation where there are unestablished bits. Other than the exemplified modulation type, the present invention can be applied as well to such modulation types as $2^k$ PSK ($\underline{k}$ is a natural number equal to or less than $\underline{m}$), where a maximum number of bits transmitted per symbol is $\underline{m}$ bits, and $2^k$ ASK ($\underline{k}$ is a natural number equal to or less than $\underline{m}$), where a maximum number of bits transmitted per symbol is $\underline{m}$ bits.

Also, when a plurality of bits of information are mapped to signal points in multi-level modulation, a difference may be present in the error rate per bit depending on a modulation type and a mapping method. In the following description, in a situation where a difference is present in the error rate, a bit which is mapped to reduce the error rate is designated by an "upper bit" of the multi-level modulation, and a bit which is mapped to increase the bit rate is designated by a "lower bit." For bits which present the same error rate, any bit may be designated by the upper bit or the lower bit.

Also, for simplicity, the following description is centered on the application of the adaptive modulation method and coding rate control method of the present invention to a signal which is transmitted from a first RF station to a second RF station, where the first RF station is designated by a "transmitter station," and the second RF station is designated by a "receiver station." On the other hand, the adaptive modulation method and coding rate control method of the present invention can be applied to both the transmission of a signal from the first RF station to the second RF station and the transmission of a signal from the second RF station to the first station, in which case, each of the first and second RF stations performs signal processing associated with both the transmitter station and receiver station, later described. Also, in cellular communications and wireless LAN communications, any of a base station, an access point, and a terminal device may be operated as a transmitter station or a receiver station.

For the propagation path quality used in the following description, any parameter can be used as long as it has a value which is positively or negatively correlated with an error rate or a communication quality when a signal is communicated, a mutual information amount between the transmitter station and the receiver station, and the like, such as a power strength of a received signal, an interference power strength, a signal-to-interference ratio, a signal-to-noise ratio, and the like. Specifically, a high propagation path quality refers to high power of a received signal, or a low interference strength, or a high signal-to-interference ratio and a noise-to-power ratio, or small fluctuations in the power of a received signal, or the like, whereas a low propagation path quality refers to the contrary to the foregoing.

In the following description, a signal for use in estimating the propagation path quality is called a "pilot signal." The pilot signal refers to a signal which is constant in signal amplitude and phase or a signal having a fixed pattern for the signal amplitude and phase during transmission, and is used to estimate fluctuations in signal amplitude and phase on a propagation path from a difference of the signal amplitude or phase between a transmitted signal and a signal received at a receiver station. Pilot signals available for this purpose are not only an individual pilot signal per communication between a transmitter station and a receiver station, but also, for example, a common pilot signal transmitted from a base station in the cellular communication, a preamble in a pilot communication, and the like, but signals available for this purpose will be collectively called the "pilot signal" in the following description.

Now, the adaptive modulation method and coding rate control method according to the present invention will be described with reference to the accompanying drawings. In the present invention, a codeword created by encoding a channel code is divided, and transmitted from a transmitter station to a receiver station in division units. This division unit is called a "sub-frame" in the following description. Also, in the drawings and following description, the number of bits allocated to each of sub-frames generated by dividing a codeword in the transmitter station is designated by Nc; the number of bits for use in actual modulation per sub-frame in the transmitter station by Nt; and the number of bits resulting from demodulation per sub-frame in the receiver station by Nr. Assuming, for example, that the number of symbols modulated per sub-frame is represented by M, and that a maximum number of bits transmitted per symbol having been fixed in the system, which has been agreed by the transmitter station and receiver station in advance is six, Nc is the product of six and M. Also, when all symbols in a sub-frame is modulated in accordance with 64 QAM in the transmitter station, the value of Nt is the product of six, which is the number of bits that can be transmitted per symbol in 64 QAM, and M. Likewise, when all symbols in a sub-frame are demodulated in accordance with 16 QAM in the receiver station, the value of Nr is the product of four, which is the number of bits that can be transmitted per symbol, and M.

Figure 9:
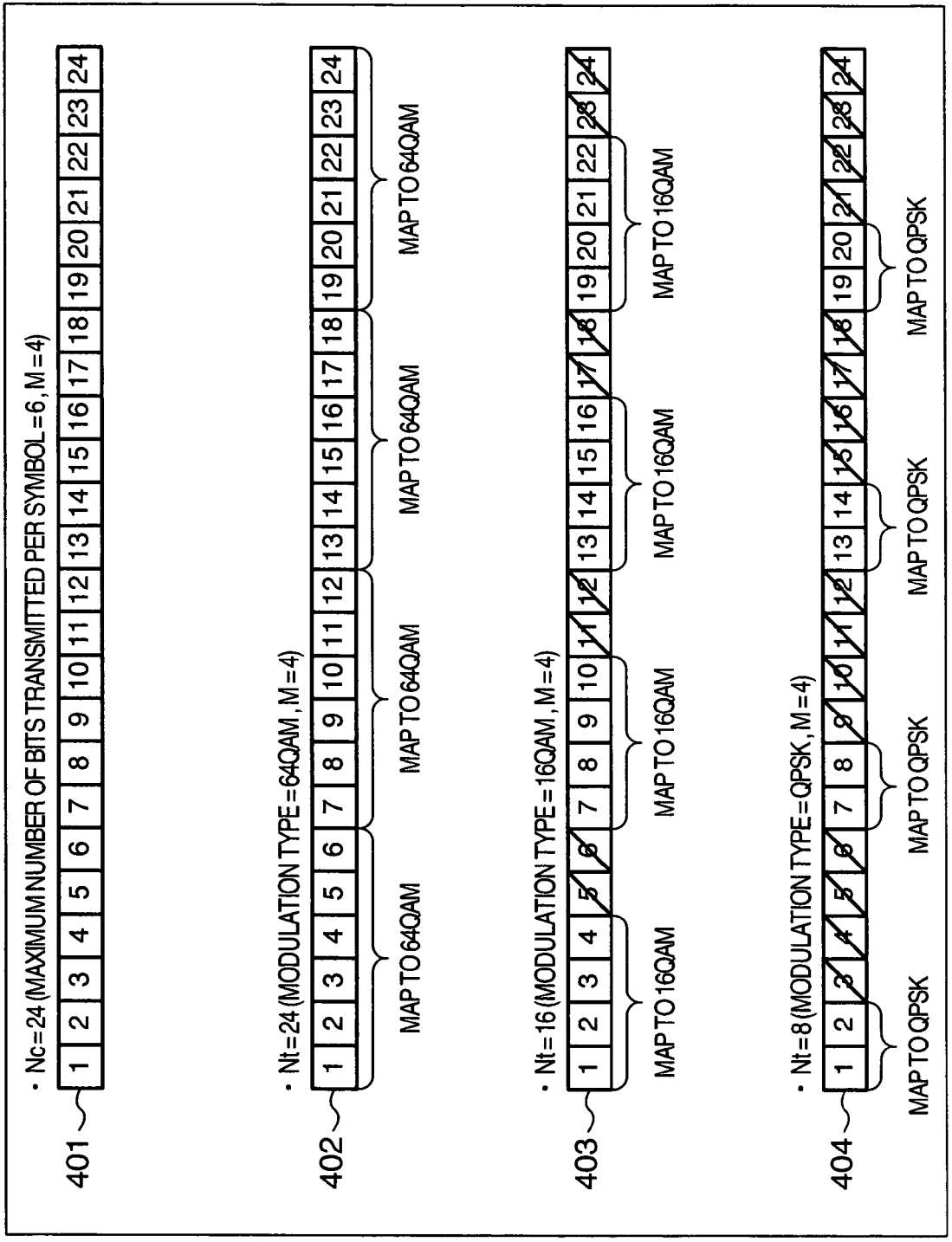
FIG. 9 shows exemplary mapping of codewords to modulated symbols in the present invention.

The relationship between the nu0mber of bits and mapping of the foregoing example will be described with reference to FIG. 9. As an example, when the number M of symbols modulated per sub-frame is four, a codeword is divided into sub-frames, each of which is allocated 24 bits (=6*4). In FIG. 9, a bit sequence 401 is a schematic diagram representing how the foregoing is done. Numbers in frames mean bit numbers counted from the head of the sub-frame.

In FIG. 9, a bit sequence 402 represents how each of symbols in a sub-frame is modulated using 64 QAM, wherein 24 bits allocated to the sub-frame are modulated in order on a symbol-by-symbol basis using every six bits, which are the number of bits transmitted per symbol of 64 QAM. Here, a bit designated by a smaller number is assigned to an upper bit of a 64 QAM modulated symbol.

In FIG. 9, a bit sequence 403 represents how each of symbols in the sub-frame is modulated using 16 QAM, wherein 24 bits allocated to the sub-frame is divided into blocks of six bits, which is the maximum number of bits transmitted per symbol, and then four bits designated smaller numbers in each division unit are modulated in accordance with 16 QAM. Here, two bits in each block, which are not assigned for modulation, are not used for transmission and discarded here. Also, among the four bits assigned for modulation, a bit designated a smaller number is assigned to a more significant bit of a 16 QAM modulated symbol.

In FIG. 9, a bit sequence 404 represents how each of the symbols in the sub-frame is modulated using QPSK, wherein 24-bits allocated to the sub-frame is divided into blocks of six bits, which is the maximum number of bits transmitted per symbol, and two bits designated the smallest numbers in each block are assigned for QPSK modulation. Here, two bits, which are not assigned for modulation, are not used for transmission, and discarded here.

In place of the discarded bits in the bit sequences 403, 404 of FIG. 9, signals having a likelihood equal to zero are fitted after demodulation in the receiver station to create a situation similar to a puncture, resulting in characteristics similar to those presented when the coding rate for channel codes is changed.

As shown in the bit sequences 402, 403, 404 of FIG. 9, irrespective of whichever modulation type is used from among those which differ in the number of bits per symbols from one another, delimiters between adjacent symbols are made to always appear at the same positions. For example, in the bit sequence 402 of FIG. 9, the seventh to twelfth bits mapped to the second 64 QAM symbol are either mapped to the second symbol or are not used in any of the bit sequences 403, 404 of FIG. 9, and are not mapped to a symbol other than the second one. In this way, even if a modulation type selected on the transmission side is different from a modulation type selected on the reception side for demodulation, continuous errors will never occur due to a shift in the sequence of bits.

Also, in the bit sequence 402 in which a larger number of bits are included in each symbol, those bits designated smaller numbers, which are assigned to more significant bits, are used in the bit sequences 403 and 404 in which a smaller number of bits are included in each symbol. In this way, for example, when symbols are modulated in accordance with 64 QAM as shown in the bit sequence 402 on the transmission side, while symbols are demodulated in accordance with 16 QAM as shown in the bit sequence 403 on the reception side, the reception side can extract information of an amount equal to the number of bits which can be produced without fail by demodulation in accordance with a type selected on the reception side, though useless transmission power is consumed for the transmission of the lower bits in each symbol. Further, from that fact that a large degradation will not result from the difference between the modulation type selected in the transmitter station and the modulation type selected for demodulation in the receiver station, the degree of freedom can be increased for the control of modulation type.

As described above, without relying on the number of bits transmitted per symbol of a used modulation type or without changing delimiters between symbols, bits used for modulation by a modulation type which processes a smaller number of bits transmitted per symbol are assigned to more significant bits when utilizing a modulation type which processes a larger number of bits transmitted per symbol, thereby making it possible to implement an adaptive modulation which is capable of switching modulation types individually for the transmitter station and receiver station in accordance with possible fluctuations on a propagation path therebetween.

Also, in the foregoing description, the encoding represents processing which includes, for example, the addition of error detection information such as CRC (Cyclic Redundancy Check) and parity bits, adjustments of a code length through puncture and repetition, and interleaving in addition to the mapping using, for example, such codes as a convolution code, a turbo code, an LDPC (Low Density Parity Check) code. A codeword represents a sequence of bits generated after such processing. Similarly, the decoding represents the processing for recovering information bits before encoding from a codeword resulting from demodulation and likelihood information on each bit of the codeword in the receiver station, and includes deinterleaving, recovery of adjustments of a code length such as puncture and repetition, error determination using error detecting information, and the like.

Also, in the following schematic diagrams and description with reference to the schematic diagrams, a codeword is divided into six sub-frames for transmission, but the codeword need not be divided by six, but may be divided by any natural number equal to or more than two.

FIG. 1 is a schematic diagram illustrating the flow of signal processing in a first embodiment of the present invention. The first embodiment will be described in connection with an example in which the number Nt of bits per symbol is fixed in the modulation, the number Nr of bits per symbol is variable in the demodulation, and it is determined at a receiver whether or not decoding is performed and whether or not the transmission of a codeword is terminated. In the adaptive modification method and coding rate control method in the first embodiment of the present invention, data to be transmitted is first encoded using a channel code to create a codeword 101 which is then divided into sub-frames of Nc bits in a transmitter station 100.

The maximum number Nc of bits transmitted per symbol in a modulation type may be set at a fixed value in the overall system and shared by the transmitter station and receiver station. Also, the maximum number Nc of bits transmitted per symbol may be broadcast as information inherent to a base station (transmitter station or receiver station), such that a terminal (receiver station or transmitter station) receives and stores the maximum number in the event of a handover or a position registration. Also, the maximum number Nc of bits transmitted per symbol in a modulation type may be included in a control signal which is communicated during a connection process.

Also, the receiver station determines the number Ns of received bits required for decoding such that the created codeword 101 can be decoded at a desired probability. The value of Ns can be found, for example, by selecting an coding rate required for satisfying desired communication characteristics, from the relationship with the communication characteristics such as power per bit, an error rate, and the like when there is no fluctuations in propagation path quality, and dividing the number of information bits before encoding by the selected coding rate. As an example, when 100 bits of information are encoded with a code which presents an coding rate equal to $\frac{1}{3}$ so that Nc is equal to 300 (Nc=300), the original number of information bits, i.e., 100 is divided by $\frac{1}{2}$ to derive 200 which is assigned to the value of Ns, whereby even when the propagation path quality fluctuates, it is possible to accomplish substantially similar characteristics which are provided when a code with an coding rate equal to ½ is used when the propagation path quality does not fluctuate.

In FIG. 1, at a timing 102 at which a first sub-frame is transmitted, the transmitter station creates a modulated symbol using Nt bits determined in accordance with a used modulation type from among Nc bits of information allocated to the sub-frame, and transmits the first sub-frame to the receiver station. The receiver station receives the first sub-frame at a timing 112 in FIG. 1, and demodulates the received first sub-frame in accordance with a modulation type selected in accordance with a measured propagation path quality to obtain the result of demodulating Nr bits. The receiver station compares an accumulation total of Nr from the start of the reception of the codeword with Ns which is determined as the number of bits required for decoding, and since the result of the comparison shows that the accumulation total of Nr is smaller than Ns, the receiver station sends a Nack signal which notifies the transmitter station that the receiver station has not received the number of bits required for decoding at a desired probability and the reception has not been completed. Upon receipt of the Nack signal, the transmitter station again makes a transmission at a timing 103 in FIG. 1 in a manner similar to the transmission at the timing 102. The receiver station also repeats the reception at a timing 113 in FIG. 1 in a manner similar to the reception at the timing 112 until the accumulation total of Nr amounts to Ns or more.

When the accumulation total of Nr has amounted to Ns or more or when all sub-frames divided from the codeword have been received at the receiver station, the receiver station transmits an ACK signal to the transmitter station for notifying that the reception is completed, and collects signals so far demodulated for decoding. For decoding the demodulated signal, when the number of bits resulting from the demodulation is less than the codeword length, a signal having a likelihood equal to zero is added to the bits before they are decoded. Also, at the time the Ack signal is received, the transmitter station stops transmitting the codeword corresponding to the Ack signal, thereby making it possible to control the adaptive modulation in accordance with the propagation path quality, and to control the coding rate in accordance with a modulation type with which the sub-frames can be actually propagated.

The configuration of the transmitter station and the flow of signal processing in the first embodiment of the present invention will be described with reference to FIG. 2.

Figure 2:
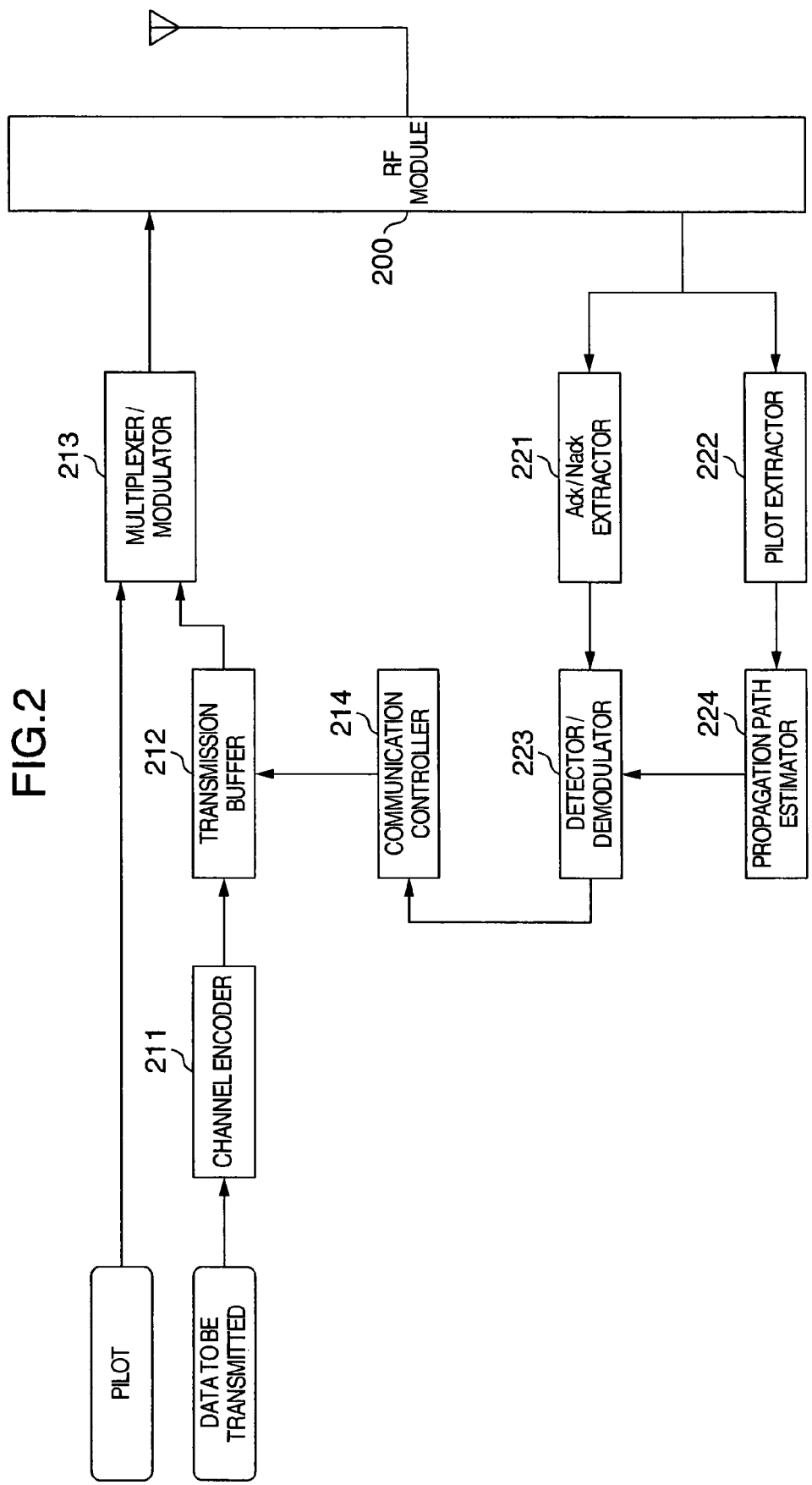
FIG. 2 is a block diagram illustrating an exemplary transmitter station in the first embodiment of the present invention.

In the transmitter station illustrated in FIG. 2, data to be transmitted is first encoded in a channel encoder 211, and accumulated in a transmission buffer 212. The signal accumulated in the transmission buffer 212 is divided into sub-frames which are inputted to a multipliexer/modulator 213 when a continued transmission is instructed from a transmission controller 214 or when no instruction is issued from the transmission controller 214, such as in the first transmission, and multiplexed with a pilot signal. The resulting signal is modulated in accordance with a predefined modulation type, and transmitted from an RF module 200.

In the transmitter station illustrated in FIG. 2, a pilot signal is extracted by a pilot extractor 222 from among signals received at the RF module 200, and an amplitude and phase fluctuation information on a propagation path is found in a propagation path estimator 224 by both averaging the extracted signal and comparing the averaged signal with the transmitted signal itself, and notified to a detector/demodulator 223. Also, an Ack/Nack signal is extracted in an Ack/Nack extractor 221 from among signals received at the RF module 200, and demodulated in the detector/demodulator 223 using the amplitude and phase fluctuation information found in the propagation path estimator 224. The result of the demodulation is notified to the transmission controller 214. The transmission controller 214 instructs the transmission buffer 212 to stop transmitting sub-frames of an associated codeword when the notified result of the demodulation is Ack, and to continue to transmit the sub-frames of the associated codeword when Nack is notified to the transmission controller 214, thereby providing the signal processing of the transmitter station for implementing the first embodiment of the present invention.

Next, the configuration of the receiver station and the flow of signal processing in the first embodiment of the present invention will be described with reference to FIG. 3.

Figure 3:
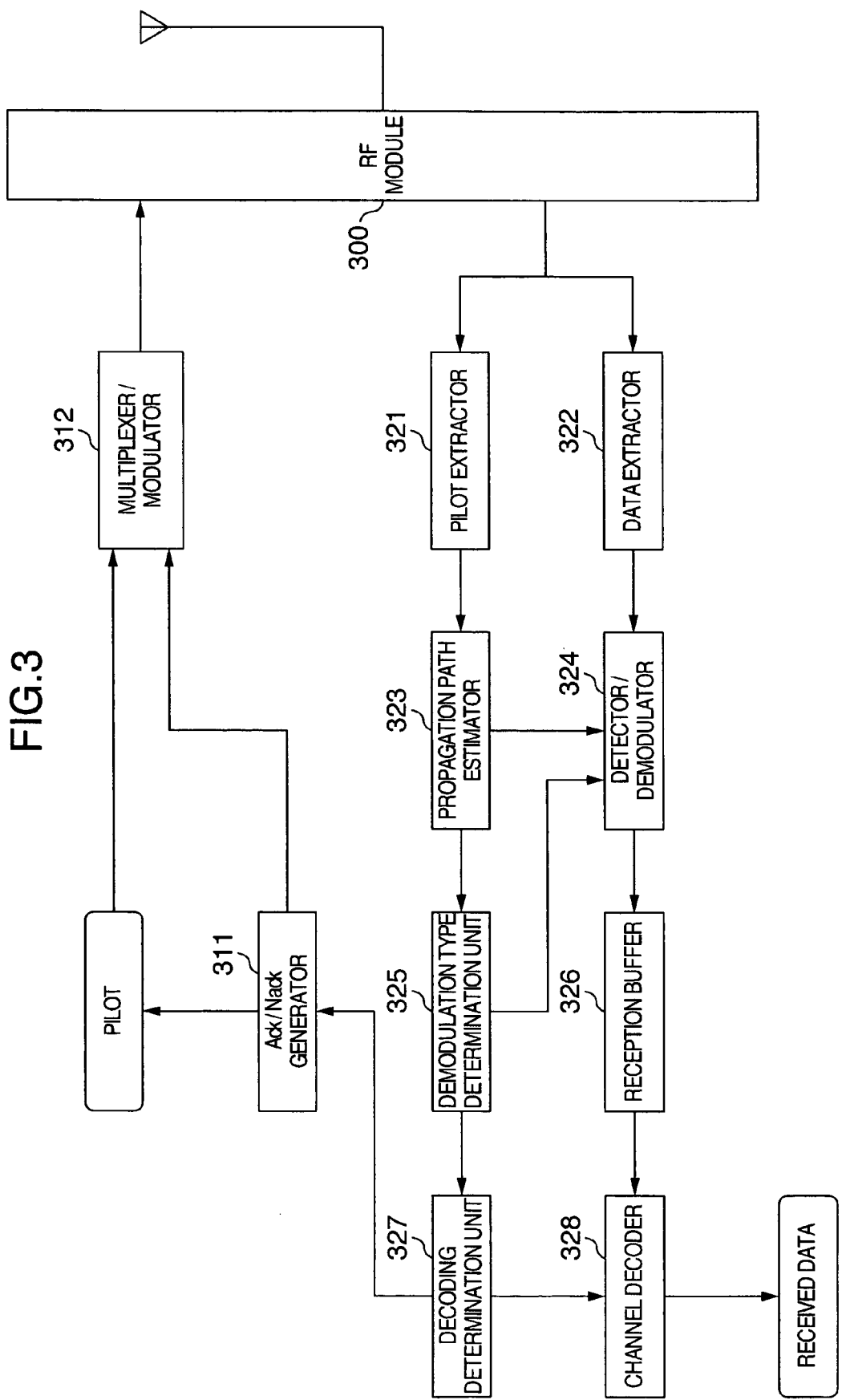
FIG. 3 is a block diagram illustrating an exemplary receiver station in the first embodiment of the present invention.

In the receiver station illustrated in FIG. 3, a pilot signal is extracted by a pilot extractor 321 from among signals received at an RF module 300, and amplitude and phase fluctuation information on a propagation path is found in a propagation path estimator 323 and notified to a detector/demodulator 324. The propagation path estimator 323 also estimates the quality of the propagation path based on the received pilot signal, and notifies a demodulation type determination unit 325 of the result of the estimation. The demodulation type determination unit 325 selects a modulation type in accordance with the propagation path quality such that a larger number of transmitted bits are allocated to each symbol as the propagation path quality is higher, and notifies the detector/demodulator 324 of the selected modulation type. Also, the demodulation type determination unit 325 notifies a decoding determination unit 327 of a sum total Nr of the number of bits transmitted per symbol of the selected modulation type for all symbols within a sub-frame. The decoding determination unit 327 accumulates the notified sum total Nr of the number of transmitted bits for a codeword which is being received, compares the result of the accumulation with the number Ns of bits required for decoding, and instructs an Ack/Nack generator 311 to generate a Nack signal when the result of the accumulation is smaller than Ns. On the other hand, when the result of the accumulation is equal to or larger than Ns, and when the receiver station has received all sub-frames divided from the codeword being received, the decoding determining unit 327 instructs the Ack/Nack generator 311 to generate an Ack signal, and instructs the channel decoder 328 to decode the received sub-frames.

On the other hand, data is extracted by a data extractor 322 from among the signals received at the RF module 300, and the detector/demodulator 324 demodulates the data in accordance with the modulation type notified from the demodulation type determination unit 325 using the amplitude and phase fluctuation information on the propagation path notified from the propagation path estimator 323, and accumulates the result in a reception buffer 326. In this event, when the number of bits transmitted per symbol of the modulation type notified from the demodulation type determination unit 325 is smaller than the maximum number of bits transmitted per symbol, the difference is replenished by adding signals each having a likelihood equal to zero. The reception buffer 326 accumulates likelihood information of Nc bits, which is the maximum number of bits transmitted per sub-frame, by adding likelihood information of Nr bits resulting from the demodulation per sub-frame and the added signals having a likelihood equal to zero. The channel decoder 328, when instructed to decode from the decoding determination unit 327, receives the information accumulated in the reception buffer 326, and decodes the received information to create received data.

Also, in the receiver station illustrated in FIG. 3, the Ack/Nack generator 311 generates the Ack or Nack signal as instructed from the decoding determination unit 327. The Ack or Nack signal is modulated together with the pilot signal in the multiplexer/modulator 312, and transmitted to the transmitter station through the RF module 300, thereby providing the signal processing of the receiver station which implements the first embodiment of the present invention.

While the foregoing first embodiment of the present invention has been described to notify both Ack and Nack from the receiver station to the transmitter station, the Ack signal alone may be actually transmitted from the receiver station to the transmitter station, while the Nack signal is not transmitted, in which case when the transmitter station does not receive the Ack signal, the transmitter station may make a similar determination to that which is made when the Nack signal is received in the foregoing description.

Figure 4:
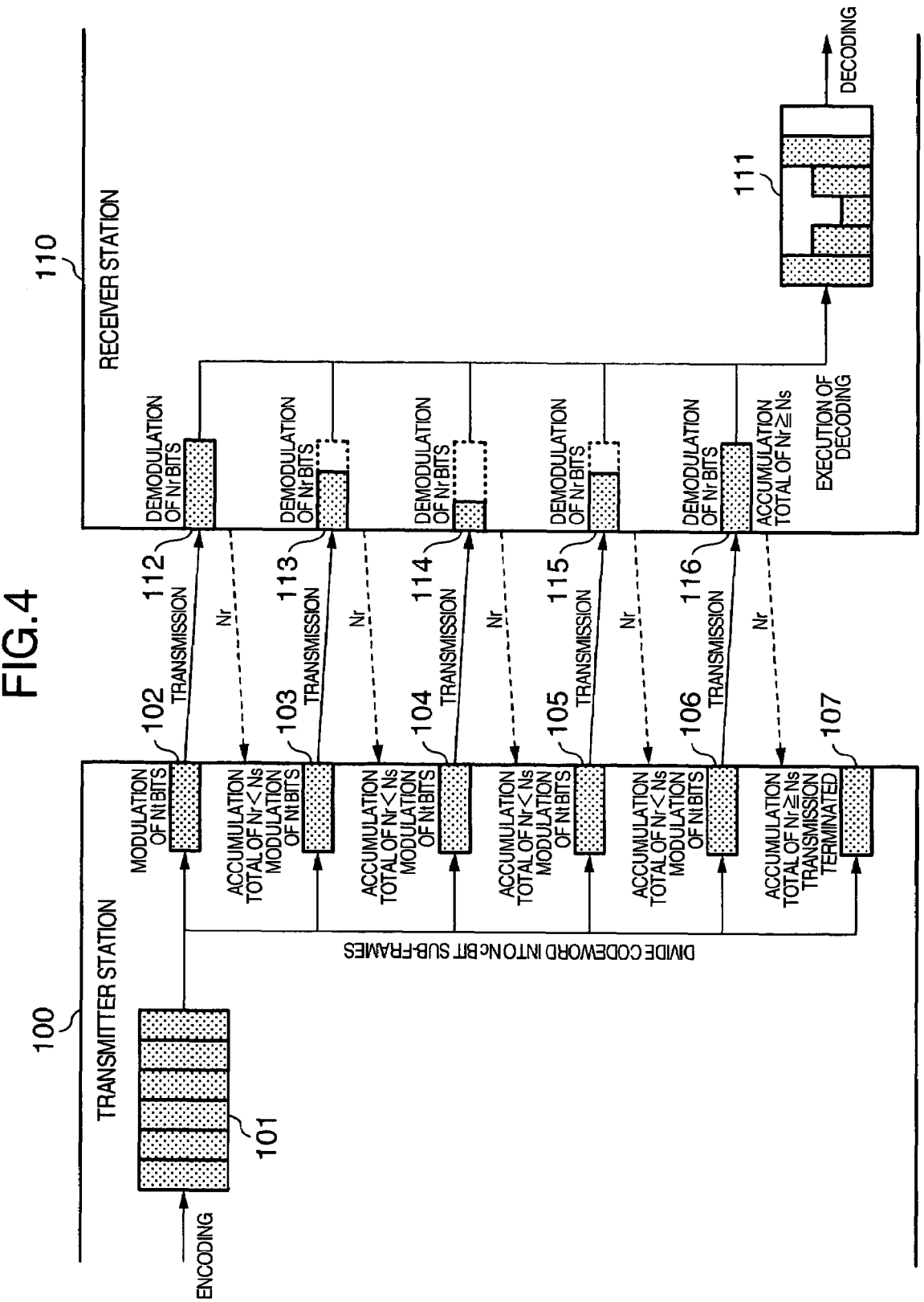
FIG. 4 is a diagram illustrating an adaptive modulation and coding rate control method according to a second embodiment of the present invention.

FIG. 4 is a schematic diagram illustrating the flow of signal processing in a second embodiment of the present invention. In the second embodiment, the number Nt of bits per symbol in the modulation is fixed, the number Nr of bits per symbol in the demodulation is variable, and the receiver station determines whether or not a received signal is decoded, while the transmitter station determines whether or not the transmission of a codeword is terminated. In the adaptive modulation method and coding rate control method in the second embodiment of the present invention, the transmitter station 100 first encodes data to be transmitted using a channel code to create a codeword 101 which is divided into sub-frames each having Nc bits. The receiver station 110 in turn determines the number Ns of received bits required for decoding, in a manner similar to the first embodiment, such that the created codeword 101 can be decoded at a desired probability.

While the flow of processing per sub-frame in the transmission from the transmitter station to the receiver station and the decoding in the receiver station proceeds in the second embodiment in a manner similar to the first embodiment, signals notified from the receiver station to the transmitter station in the second embodiment differ from those in the first embodiment. Specifically, the receiver station notifies the transmitter station of the value of the number Nr of bits which results from the demodulation or a code which serves as an index indicative of the value of Nr. In the second embodiment of the present invention, the transmitter station accumulates the value of Nr notified thereto, and stops the transmission at the time the result of the accumulation amounts to Ns or more, thereby making it possible to control the coding rate in accordance with a modulation type with which the sub-frames can be actually propagated.

The configuration of the transmitter station and the flow of signal processing in the second embodiment of the present invention will be described with reference to FIG. 5.

Figure 5:
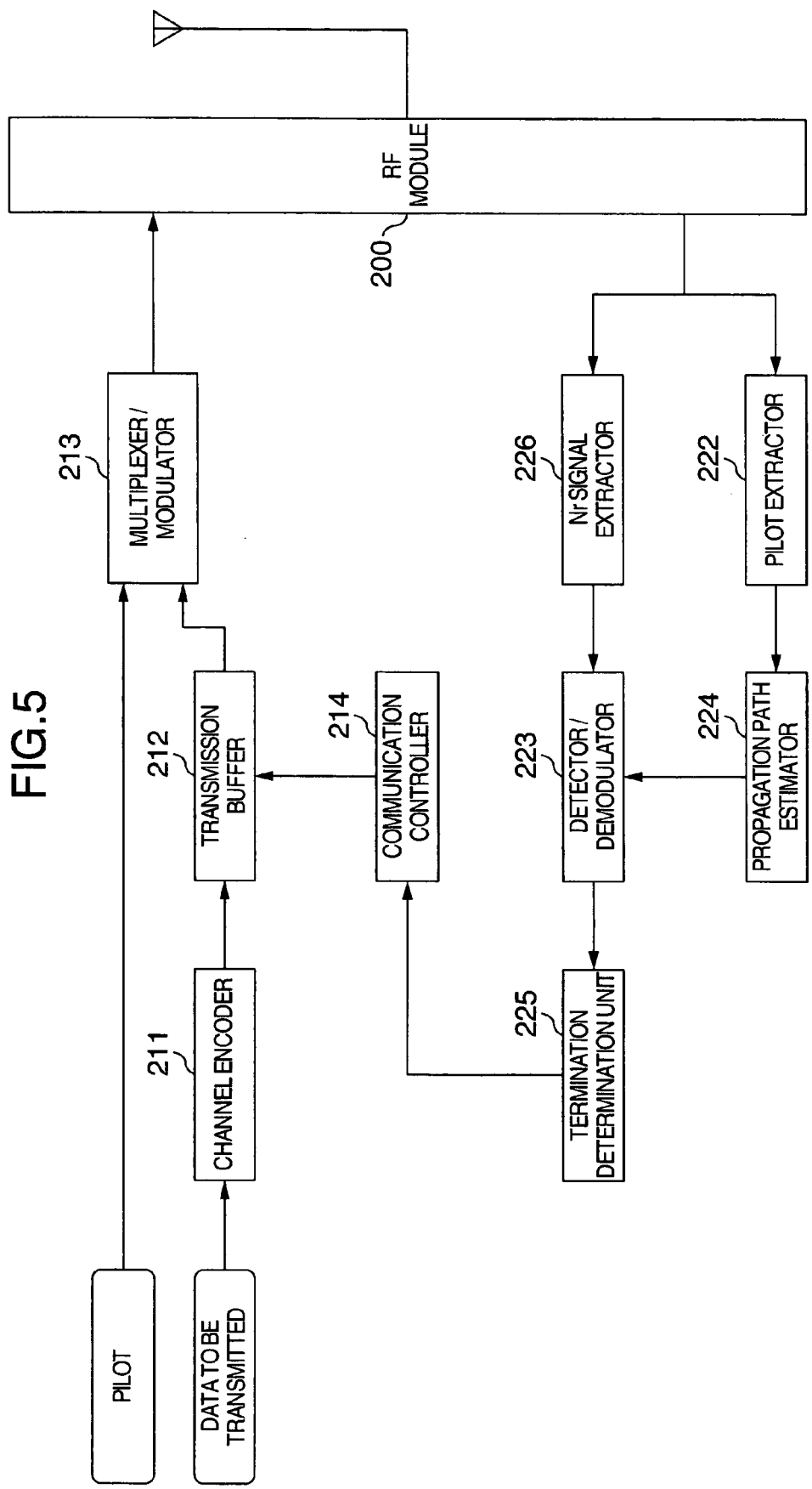
FIG. 5 is a block diagram illustrating an exemplary transmitter station in the second embodiment of the present invention.

In the transmitter station illustrated in FIG. 5, data to be transmitted is first encoded in a channel encoder 211, and accumulated in a transmission buffer 212. The signal accumulated in the transmission buffer 212 is divided into sub-frames which are inputted to a multipliexer/modulator 213 when a continued transmission is instructed from a transmission controller 214 or when no instruction is issued from the transmission controller 214, such as in the first transmission, and multiplexed with a pilot signal. The resulting signal is modulated in accordance with a predefined modulation type, and transmitted from an RF module 200.

In the transmitter station illustrated in FIG. 5, a pilot signal is extracted by a pilot extractor 222 from among signals received at the RF module 200, and an amplitude and phase fluctuation information on a propagation path is found in a propagation path estimator 224, and notified to a detector/demodulator 223. Also, an Nr signal is extracted in an Nr signal extractor 221 from among the signals received at the RF module 200, and demodulated in the detector/demodulator 223 using the amplitude and phase fluctuation information found in the propagation path estimator 224. The result of the demodulation is notified to a termination determination unit 225. The termination determination unit 225 accumulates Nr which represents the number of bits resulting from the demodulation of a sub-frame in the receiver station based on the Nr signal, determines whether or not the result of the accumulation amounts to a number equal to or larger than Ns, and notifies the transmission controller 214 of the result of the determination. The transmission controller 214 instructs the transmission buffer 212 to stop transmitting sub-frames of an associated codeword when the termination determination unit 225 determines that the number of accumulated bits is equal to or larger than Ns, and otherwise to continue to transmit the sub-frames of the associated codeword.

Next, the configuration of the receiver station and the flow of signal processing in the first embodiment of the present invention will be described with reference to FIG. 6.

Figure 6:
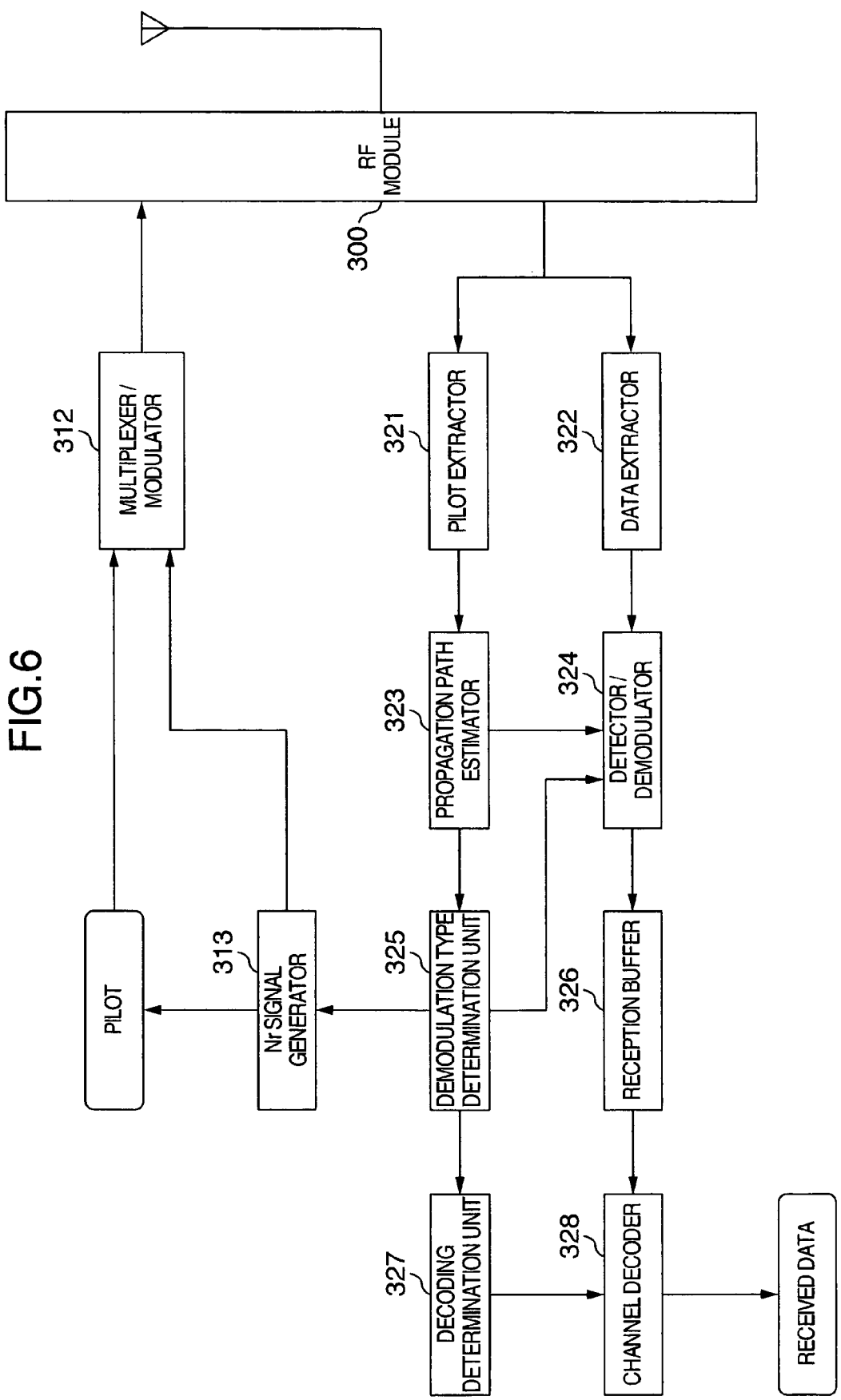
FIG. 6 is a block diagram illustrating an exemplary receiver station in the second and third embodiments of the present invention.

In the receiver station illustrated in FIG. 6, a pilot signal is extracted by a pilot extractor 321 from among signals received at an RF module 300, and amplitude and phase fluctuation information on a propagation path is found in a propagation path estimator 323 and notified to a detector/demodulator 324. The propagation path estimator 323 also estimates the quality of the propagation path based on the received pilot signal, and notifies a demodulation type determination unit 325 of the result of the estimation. The demodulation type determination unit 325 selects a modulation type in accordance with the propagation path quality such that a larger number of transmitted bits are allocated to each symbol as the propagation path quality is higher, and notifies the detector/demodulator 324 of the selected modulation type. Also, the demodulation type determination unit 325 notifies an Nr signal generator 313 and a decoding determination unit 327 of a sum total Nr of the number of bits transmitted per symbol of the selected modulation type for all symbols within a sub-frame. The decoding determination unit 327 accumulates the notified sum total Nr of the number of transmitted bits for a codeword which is being received, compares the result of the accumulation with the number Ns of bits required for decoding, and instructs a channel decoder 328 to decode when the result of the accumulation is equal to or larger than Ns, and when the receiver station has completed the reception of all sub-frames divided from the codeword being received.

On the other hand, data is extracted by a data extractor 322 from among the signals received at the RF module 300, and the detector/demodulator 324 demodulates the data in accordance with the modulation type notified from the demodulation type determination unit 325 using the amplitude and phase fluctuation information on the propagation path notified from the propagation path estimator 323, and accumulates the result in a reception buffer 326. In this event, when the number of bits transmitted per symbol of the modulation type notified from the demodulation type determination unit 325 is smaller than the maximum number of bits transmitted per symbol, the difference is replenished by adding signals each having a likelihood equal to zero. The reception buffer 326 accumulates likelihood information of Nc bits, which is the maximum number of bits transmitted per sub-frame, by adding likelihood information of Nr bits resulting from the demodulation per sub-frame and the added signals having a likelihood equal to zero. The channel decoder 328, when instructed to decode from the decoding determination unit 327, receives the information accumulated in the reception buffer 326, and decodes the received information to create received data.

Also, in the receiver station illustrated in FIG. 6, the Nr signal generator 313 generates the value of Nr itself or a code indicative of the value of Nr as an Nr signal based on the value of Nr notified from the demodulation type determination unit 325. The generated Nr signal is modulated together with the pilot signal by the multiplexer/modulator 312, and transmitted to the transmitter station through the RF module 300, thereby providing the signal processing of the receiver station which implements the second embodiment of the present invention.

In the second embodiment, since the number Nr of bits per symbol in the demodulation is used both for determining a modulation type and for determining whether or not a codeword has been transmitted, fewer control signals can be transmitted from the receiver station to the transmitter station.

Figure 7:
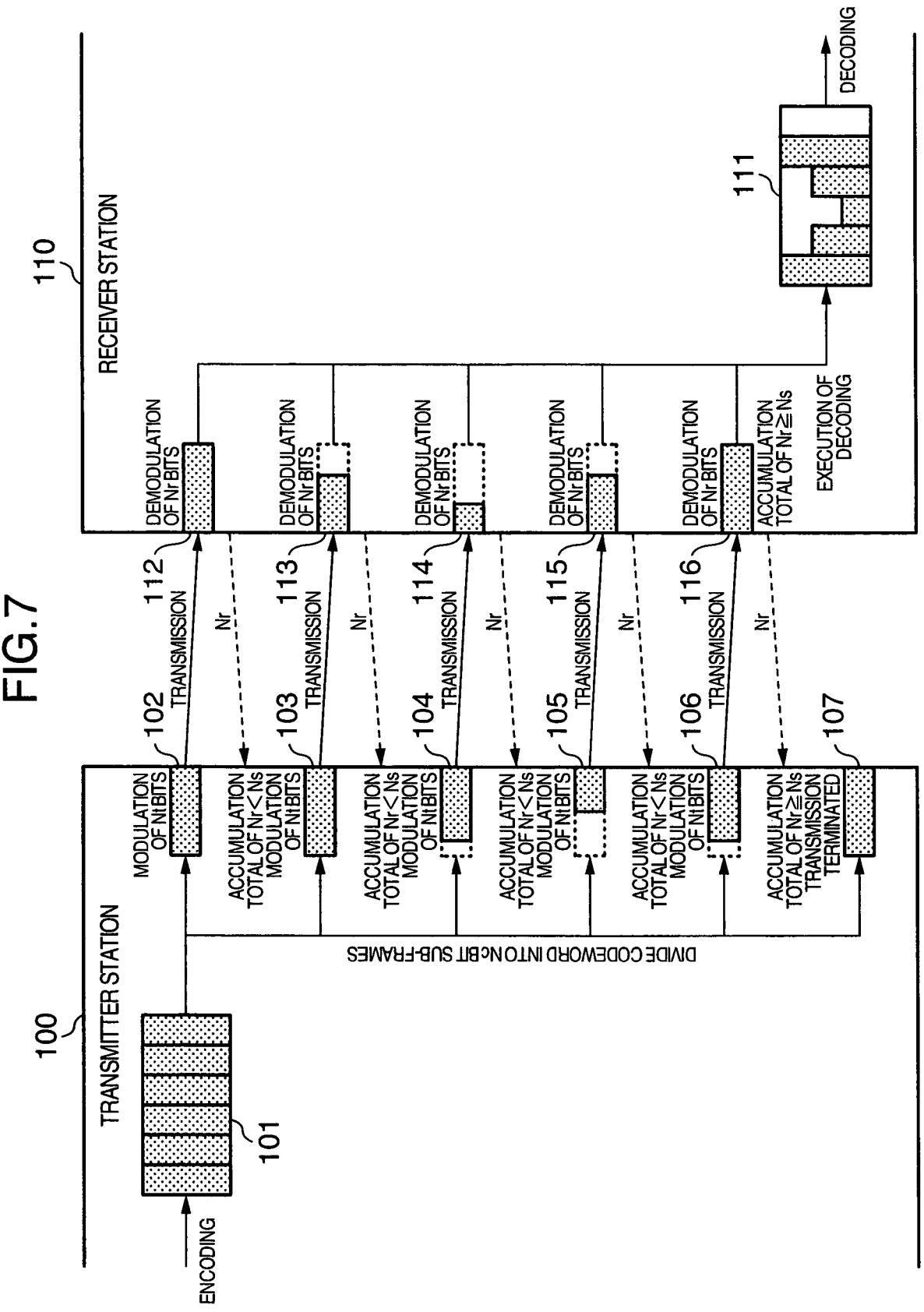
FIG. 7 is a diagram illustrating an adaptive modulation and coding rate control method according to a third embodiment of the present invention.

FIG. 7 in turn is a schematic diagram illustrating the flow of signal processing in a third embodiment of the present invention.

In the third embodiment, the number Nt of bits for use in the modulation per sub-frame, and the number Nr of bits resulting from the demodulation per sub-frame are both variable. The transmitter station determines the number Nt of bits for use in the modulation per sub-frame, and whether to terminate the transmission of a codeword or not. The receiver station in turn determines the number Nr of bits resulting from the demodulation per sub-frame, and whether to decode a received signal. The third embodiment of the present invention performs the processing similar to that in the second embodiment of the present invention except that the transmitter station controls a modulation type in accordance with the information of Nr notified from the receiver station. In the third embodiment of the present invention, the transmitter station utilizes the notified Nr, modulates a signal to be transmitted in accordance with a modulation type which processes a larger number of bits per symbol as Nr is larger, and in accordance with a modulation type which processes a smaller number of bits per symbol as Nr is smaller. For example, by selecting a modulation type such that the number Nr notified from the receiver station or an average value of a plurality of the numbers Nr received in the past is the same as the value of Nt in the transmitter station, good characteristics can be accomplished particularly when a propagation path lightly fluctuates. On the other hand, by comparing the number Nr notified from the receiver station or an average value of a plurality of the numbers Nr received in the past with the value of Nt in the transmitter station and selecting a modulation type such that the value of Nt in the transmitter station is equal to or larger than the number Nr notified from the receiver station or the average value of a plurality of the numbers Nr received in the past, good characteristics can be accomplished particularly when a propagation path heavily fluctuates. As to whether a propagation path fluctuates lightly or heavily, the propagation path can be determined to lightly fluctuate, for example, when there are few changes in a plurality of past values of Nr, and to heavily fluctuate when there are a large number of changes in the past values of Nr.

The configuration of the transmitter station and the flow of signal processing in the third embodiment of the present invention will be described with reference to FIG. 8.

Figure 8:
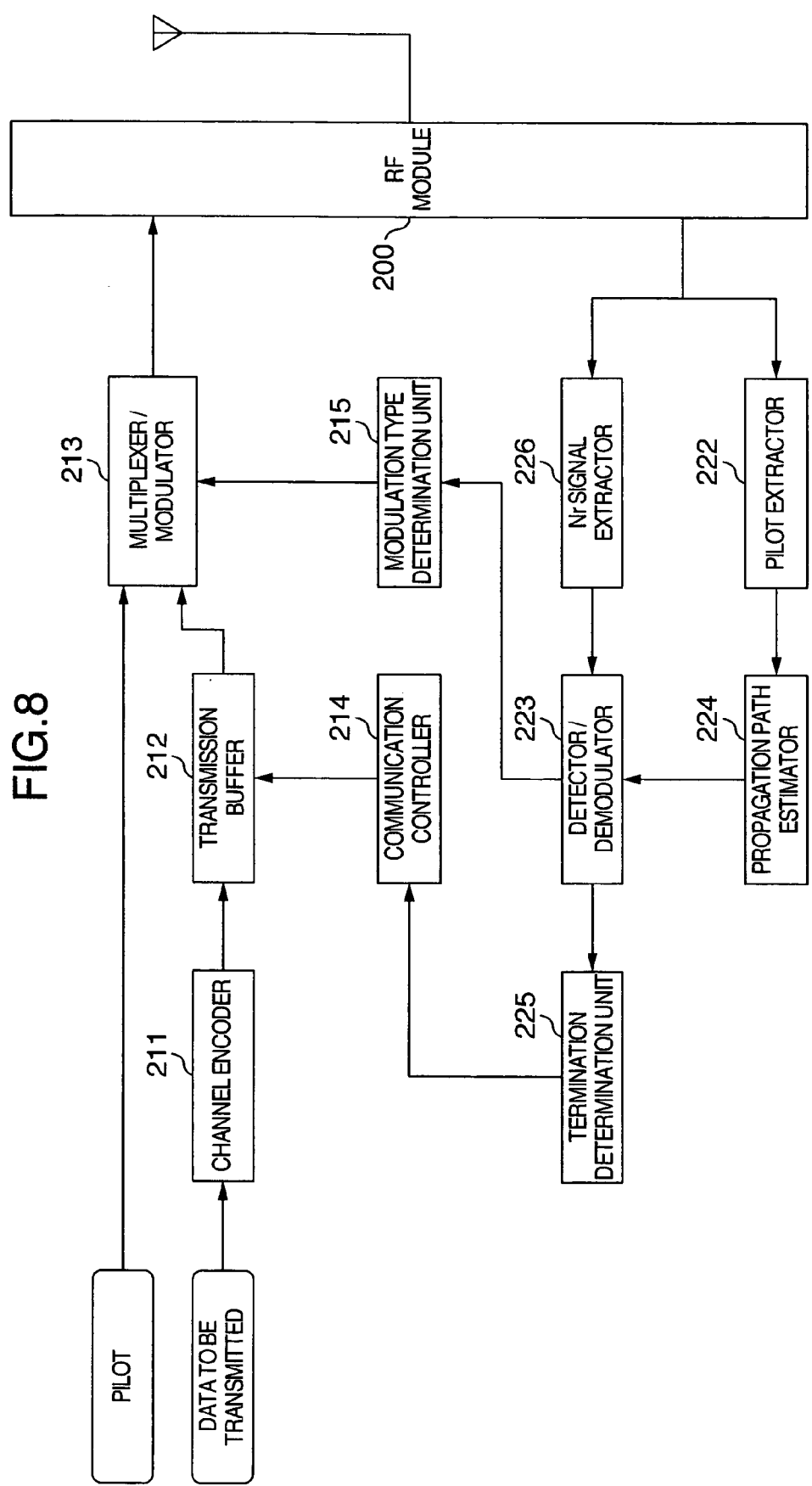
FIG. 8 is a block diagram illustrating an exemplary transmitter station in the third embodiment of the present invention.

In the transmitter station illustrated in FIG. 8, data to be transmitted is first encoded in a channel encoder 211, and accumulated in a transmission buffer 212. The signal accumulated in the transmission buffer 212 is divided into sub-frames which are inputted to a multiplexer/modulator 213 when a continued transmission is instructed from a transmission controller 214 or when no instruction is issued from the transmission controller 214, such as in the first transmission, and multiplexed with a pilot signal. The resulting signal is modulated in accordance with a modulation type supported by a modulation type determination unit 215 or a predefined modulation type, and transmitted from an RF module 200.

In the transmitter station illustrated in FIG. 8, a pilot signal is extracted by a pilot extractor 222 from among signals received at the RF module 200, and an amplitude and phase fluctuation information on a propagation path is found in a propagation path estimator 224, and notified to a detector/demodulator 223. Also, an Nr signal is extracted in an Nr signal extractor 221 from among the signals received at the RF module 200, and demodulated in the detector/demodulator 223 using the amplitude and phase fluctuation information found in the propagation path estimator 224. The result of the demodulation is notified to a termination determination unit 225 and the modulation type determination unit 215. The termination determination unit 225 accumulates Nr which represents the number of bits resulting from the demodulation of a sub-frame in the receiver station based on the Nr signal, determines whether or not the result of the accumulation amounts to a number equal to or larger than Ns, and notifies the transmission controller 214 of the result of the determination. The transmission controller 214 instructs the transmission buffer 212 to stop transmitting sub-frames of an associated codeword when it is determined that the number of accumulated bits is equal to or larger than Ns, and otherwise to continue to transmit the sub-frames of the associated codeword. The modulation type determination unit 215 in turn acquires information of Nr which represents the number of bits resulting from the demodulation of a sub-frame in the receiver station, based on the Nr signal, selects a modulation type which processes a larger number of bits per symbol as Nr is larger, and a modulation type which processes a smaller number of bits per symbol as Nr is smaller, and notifies the multiplexer/modulator 213 of the selected modulation type, thereby providing the signal processing of the transmitter station which implements the third embodiment of the present invention.

Next, the configuration of the receiver station and the flow of signal processing in the third embodiment of the present invention may be similar to the configuration of the receiver station and the flow of signal processing in the second embodiment illustrated in FIG. 6.

According to the third embodiment, the modulation can be performed in accordance with a modulation type suitable for a particular propagation path quality in the transmitter station. In this way, a smaller number of bits are transmitted when a propagation path presents a low quality, so that any transmission power need not be allocated to lower bits which are unlikely to be correctly received on the reception side, thereby making it possible to increase the amount of information transmitted per unit power consumption. Also, since the number Nr of bits per symbol in the demodulation is used both for the determination of a modulation type and for the determination as to whether a transmission should be terminated, a smaller number of control signals can be transmitted from the receiver station to the transmitter station.

Alternatively, in the third embodiment, when a modulation type is determined, the pilot signal transmitted from the receiver station may be used to estimate a propagation path quality between both stations to determine a modulation type based on the estimated propagation path quality, instead of using the number Nr of bits per symbol in the demodulation.

In the embodiments of the present invention described above, the coding rate is controlled based on the number of bits transmitted per symbol, defined by a modulation type used for the demodulation which is determined in the receiver station based on the propagation path quality. This coding rate control is not in an exclusive relationship with a HARQ-based coding rate control, so that HARQ may be added making use of the presence or absence of errors in the result of decoding in the embodiments of the present invention, and the coding rate control based on the number of transmitted bits may be conducted simultaneously with the HARQ-based coding rate control. Further, a retransmission control may be added making use of the presence or absence of errors in the result of decoding.

The present invention described above can realize an adaptive modulation which can individually switch modulation types between the transmitter station and the receiver station in accordance with a varying quality of a propagation path by allocating bits used for the modulation by a modulation type which processes a smaller number of bits per symbol to upper bits when a utilized modulation type processes a larger number of bits, without relying on the number of bits transmitted per symbol in a used modulation type or without changing the delimiter of symbols, and can make communications in response to the varying quality of the propagation path in a stable quality through simple processing by suppressing the effect of increasing the coding rate, resulting from the adaptive modulation, by the coding rate control based on the number of bits resulting from the demodulation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio station for receiving and decoding a signal in a radio communication system in which a plurality of radio stations adopt an adaptive modulation for switching modulation types individually for a transmitter radio station and a receiver radio station according to fluctuations on a propagation path between the receiver radio station and the transmitter radio station, and a plurality of radio stations for performing transmission/reception share information on a first number of bits indicative of a maximum number of bits transmitted per symbol, and a codeword is generated by encoding data with a channel code, divided, modulated, and transmitted to said radio station for receiving and decoding a signal, said radio station for receiving and decoding a signal comprising;

an RF module for receiving an RF signal from a signal transmitter station;

an estimator for estimating a quality of a propagation path through which the received signal is transmitted;

a demodulator for demodulating the received signal received by said RF module based on a modulation type by which a second number of bits per symbol are to be transmitted, said second number of bits being equal to or smaller than the first number of bits and having a positive correlation with the estimated quality of the propagation path;

a channel decoder for accumulating the second number of bits each time the received signal is demodulated, and when a result of the accumulation exceeds a predetermined value, combining received signals corresponding to the codeword, adding to the combined signals other signals having a likelihood equal to zero, and decoding the combined signals and the added other signals, the number of said other signals being equal to a difference between the first number of bits and the second number of bits.

2. The radio station according to claim 1, further comprising a termination determination unit for determining that the result of the accumulation of the second number of bits associated with the codeword exceeds the predetermined value, wherein said RF module transmits to said signal transmitter station a notification signal for notifying that the codeword has been received when the result of the accumulation exceeds the predetermined value.

3. The radio station according to claim 1, wherein said RF module transmits the second number of bits to said signal transmitter station for use by said signal transmitter station to determine whether the transmission of the codeword should be stopped or to determine the modulation type.

4. A communication method in a signal receiver station of a radio communication system, wherein a plurality of radio station adopt as adaptive modulation for switching modulation types individually for a transmitter radio station and a receiver radio station according to fluctuations on a propagation path between the receiver radio station and the transmitter radio station, and information on a first number of bits is shared between the signal radio receiver station and the signal transmitter radio station, said first number of bits indicating a maximum number of bits transmitted per symbol in a modulation type, and a codeword is generated by encoding data with a channel code divided, modulated, transmitted from said signal transmitter station, and received by said signal receiver station, said method comprising the steps of:

receiving a signal from said signal transmitter station;

estimating the quality of a propagation path between said signal transmitter station and said signal receiver station;

demodulating the received signal based on the modulation type and transmitting a second number of bits per symbol, said second number of bits being equal to or smaller than the first number of bits and having a positive correlation to the estimated propagation path;

accumulating the second number of bits for each codeword;

determining whether or not the codeword has been completely received when a result of the accumulation exceeds a predetermined value; and when the result of the accumulation exceeds the predetermined value, combining received signals associated with the codeword, adding to the combined signals other signal having a likelihood equal to zero, and decoding the combined signals and the added other signals, the number of said other signals being equal to a difference between the first number of bits and the second number of bits.

5. The communication method according to claim 4, further comprising the step of coupling results of demodulating the received signals corresponding to the codeword to decode the codeword when determining that the codeword has been completely received.

6. The communication method according to claim 4, further comprising the steps of:

transmitting to said transmitter station a notification signal for notifying that the codeword has been completely received when the result of accumulating the second number of bits associated with the codeword exceeds the predetermined value; and completing the reception of the codeword.

7. The communication method according to claim 4, wherein information on the second number of bits is transmitted to said signal transmitter station for determining in said signal transmitter station whether the transmission of the codeword is stopped, or for use in determining the modulation type in said signal transmitter station.

8. A radio receiver for receiving and decoding a signal in a radio communication system in which a plurality of radio stations adopt an adaptive modulation for switching modulation types individually for a transmitter radio station and a receiver radio station according to fluctuations on a propagation path between the receiver radio station and the transmitter radio station, the radio receiver comprising:
- an RF module for receiving the signal including information on a plurality of symbols each composed of a first number of bits;
- an estimator for estimating the quality of a transmission path through which the signal has been transmitted;
- a demodulator for demodulating the signal in accordance with a a modulation type by which a second number of bits per symbol are to be transmitted, said second number of bits being equal to or smaller than the first number of bits and having a positive correlation to the quality of the transmission path estimated by said estimator;
- a decoding determination unit for accumulating the second number of bits each time the first number of bits are demodulated, and determining whether or not the number of accumulated bits is equal to or greater than a predetermined value; and
- a channel decoder for combining said first number of bits with the second number of bits to decode the resulting bits when said decoding determination unit determines that the accumulated value of the second number of bits is equal to or greater than a predetermined value, and when the accumulated value exceeds the predetermined value, combining received signals associated with the codeword, adding to the combined signals other signals having a likelihood equal to zero, and decoding the combined signals and the added other signals, the number of said other signals being equal to a difference between the first number of bits and the second number of bits.

9. The receiver according to claim 8, wherein said RF module further transmits a signal indicative of completion of signal reception when said decoding determination unit determines that the accumulated value of the second number of bits is equal to or greater than a predetermined value.

* * * * *

UNITED STATES PATENT AND TRADEMARK OFFICE
CERTIFICATE OF CORRECTION

| | | |
|---|---|---|
| PATENT NO. | : 7,656,960 B2 | Page 1 of 1 |
| APPLICATION NO. | : 11/066185 | |
| DATED | : February 2, 2010 | |
| INVENTOR(S) | : Tamaki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this

Thirtieth Day of November, 2010

David J. Kappos
*Director of the United States Patent and Trademark Office*